US005256745A

United States Patent [19]
Grootaert

[11] Patent Number: 5,256,745
[45] Date of Patent: Oct. 26, 1993

[54] FLUORINE-CONTAINING POLYMERS AND PREPARATION AND USE THEREOF

[75] Inventor: Werner M. Grootaert, Oakdale, Minn.

[73] Assignee: Minnesota Mining and Manufacturing Company, St. Paul, Minn.

[21] Appl. No.: 6,062

[22] Filed: Jan. 15, 1993

Related U.S. Application Data

[62] Division of Ser. No. 869,943, Apr. 17, 1992, Pat. No. 5,208,305.

[51] Int. Cl.$^5$ ................................................ C08F 4/16
[52] U.S. Cl. ...................................... 526/194; 526/247; 526/249; 526/255
[58] Field of Search ............... 526/194, 247, 249, 255

[56] References Cited

U.S. PATENT DOCUMENTS

| | | |
|---|---|---|
| 4,035,565 | 7/1977 | Apotheker et al. |
| 4,233,421 | 11/1980 | worm. |
| 4,287,320 | 9/1981 | Kolb. |
| 4,450,263 | 5/1984 | West. |
| 4,524,197 | 6/1985 | Khan. |
| 4,558,141 | 12/1985 | Squire. |
| 4,743,658 | 5/1988 | Imbalzano et al. |
| 4,882,390 | 11/1989 | Grootaert et al. |
| 5,086,123 | 2/1992 | Guenthner et al. |

FOREIGN PATENT DOCUMENTS 581641 12/1988 Australia.

OTHER PUBLICATIONS

*Encyclopedia of Chemical Technology*, vol. 11, pp. 20, 21, 32, 33, 40, 41, 48, 50, 52, 62, 70, 71, John Wiley & Sons, (1980).

J. Curtice, H. Gilman, and G. Hammond, "a Study of Organosilicane Free Radicals," *J. Am. Chem. Soc.*, vol. 79, pp. 4754–4759, (1957).

P. Krusic and J. Kochi, "Electron Spin Resonance of Group IV Organometallic Alkyl Radicals in Solution," *J. Am. Chem. Soc.*, vol. 91, pp. 6161–6164, (1964).

F. W. Billmeyer, *Textbook of Polymer Science*, 3rd ed., pp. 398–403, John Wiley & Sons, New York (1984).

Brullo, R. A., "Fluoroelastomer Rubber For Automotive Applications," *Automotive Elastomer & Design*, Jun. 1985.

"Fluoroelastomer Seal Up Automotive Future," *Materials Engineering*, Oct. 1988.

"Fluorinated Elastomers," Kirk–Othermer, *Encyclopedia of Chemical Technology*, vol. 8, pp. 500–515 (3rd ed., John Wiley & Sons, 1979).

Primary Examiner—Joseph L. Schofer
Assistant Examiner—N. Sarofim
Attorney, Agent, or Firm—Gary L. Griswold; Walter N. Kirn; Robert H. Brink

[57] ABSTRACT

Group IV organometallic compounds, e.g. alkylsilane, or alkylsiloxane compounds, are used as chain tranfer agent in the radical initiated polymerization of ethylenically unsaturated monomers, to give polymers comprising non-ionic end groups.

9 Claims, No Drawings

FLUORINE-CONTAINING POLYMERS AND PREPARATION AND USE THEREOF

This is a division of application Ser. No. 07/869,943 filed Apr. 17, 1992 now U.S. Pat. No. 5,208,305.

This invention relates to fluorine-containing polymers and their preparation and use. In another aspect, this invention relates to methods of free-radical polymerization of ethylenically unsaturated monomers in the presence of chain-transfer agents, and to the resulting polymers and shaped articles thereof.

Fluorine-containing polymers, or fluoropolymers, with a carbon-carbon backbone chain are an important class of polymers and include for example, fluoroelastomers and fluoroplastics. Within this class are polymers of high thermal-stability and concurrent usefulness at high temperatures, and extreme toughness and flexibility at very low temperatures. Many of these polymers are almost totally insoluble in a wide variety of organic solvents, and are chemically inert. Some have extremely low dielectric loss and high dielectric-strength, and most have unique nonadhesive and low-friction properties. F. W. Billmeyer, *Textbook of Polymer Science*, 3rd ed., pp 398–403, John Wiley & Sons, New York (1984).

Fluoroelastomers, particularly the copolymers of vinylidene fluoride with other ethylenically unsaturated halogenated monomers, such as hexafluoropropene, have particular utility in high temperature applications, such as seals, gaskets, and linings—see, for example, Brullo, R. A., "Fluoroelastomer Rubber for Automotive Applications," *Automotive Elastomer & Design*, June 1985, "Fluoroelastomer Seal Up Automotive Future," *Materials Engineering*, October 1988, and "Fluorinated Elastomers," Kirk-Othmer, *Encyclopedia of Chemical Technology*, Vol. 8, pp. 500–515 (3rd ed., John Wiley & Sons, 1979).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, in wire, electrical components, seals, solid and lined pipes, and pyroelectric detectors. Polychlorotrifluoroethylene is compatible with liquid oxygen, and remains tough at cryogenic temperatures. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, 71, John Wiley & Sons, (1980).

Fluorine-containing polymers can be prepared by free-radical initiated polymerization of one or more fluorine-containing ethylenically unsaturated monomers. Free radicals are typically formed by the decomposition of a free-radical initiator. Free-radical initiators may be decomposed by light, heat, high energy radiation, or as a result of oxidation-reduction reactions. When free radicals are generated in the presence of free-radical polymerizable ethylenically unsaturated monomers a chain reaction occurs producing polymer. The polymer can be prepared by polymerization of monomers in bulk, in solution, in emulsion, or in suspension. Fluoroelastomers and fluoroplastics are preferably prepared by aqueous emulsion or suspension polymerization because of the rapid and nearly complete conversion of monomers, easy removal of the heat of polymerization and ready isolation of the polymer. Emulsion or suspension polymerization typically involves polymerizing monomers in an aqueous medium in the presence of an inorganic free-radical initiator system, and surfactant or suspending agent.

Polymers of low molecular-weight can be prepared by polymerizing monomers in the presence of a chain-transfer agent. Chain-transfer agents react with the growing polymer-chain. In this reaction, the growing polymer-chain is terminated and the chain-transfer agent is converted into a radical. This newly-formed free-radical typically can immediately react with monomer, thereby initiating the polymerization of a new polymer-chain. Examples of conventional chain-transfer agents are carbon tetrachloride, acetone, diethyl malonate, and dodecylmercaptan. Chain-transfer activity varies greatly with changes in solvents and monomers.

The chain-transfer constants of triphenylsilane and triethylsilane in the thermal polymerization of styrene were measured in J. Curtice, H. Gilman, and G. Hammond, "A Study of Organosilicone Free Radicals," *J. Am. Chem. Soc.*, Vol. 79, pp. 4754–4759, (1957).

In aqueous emulsion or suspension polymerization of fluorine-containing ethylenically unsaturated monomer, conventional chain-transfer agents generally can terminate a growing polymer-chain but generally do not immediately react with monomer to initiate a new polymerization. As a result, the polymerization generally is slow and most polymer chains contain an ionic end-group due to initiation by ionic radical-initiator, e.g., sulfate radical ion.

Ionic or polar end-groups generally are not desirable because of detrimental effects on rheology. U.S. Pat. No. 4,524,197 (Khan) states that the presence of acid end-groups detrimentally effects the processing characteristics of fluoroelastomers since these groups increase the viscosity of the polymer and interfere with curing systems, especially those based on quaternary phosphonium salts.

Ionic or polar end-groups may also reduce the thermal stability of certain fluorine-containing polymers. U.S. Pat. No. 4,743,658 (Imbalzano et al.) states that perfluorinated resins with certain end groups, especially —COF, —CONH$_2$, and —CF$_2$CH$_2$OH, can be chemically reactive and thermally unstable. Such end groups evolve HF, which is generated by the oxidation, hydrolysis and/or thermal decomposition of these end groups.

Polymers with non-ionic end groups can be prepared by the use of non-ionic free-radical initiators, e.g., azobisisobutyronitrile or benzoyl peroxide. However, most non-ionic free-radical initiators are insoluble in water and are therefore not suitable for aqueous emulsion or suspension polymerization of fluorine-containing monomers. The employment of water-insoluble initiators would require the use of organic co-solvents and/or seed latices produced with water-soluble initiators.

Briefly, in one aspect, the present invention provides a method for the preparation of fluorine-containing polymer comprising polymerizing, under free-radical conditions, a polymerizable mixture comprising fluorine-containing ethylenically unsaturated monomer, e.g., CF$_2$=CF$_2$, and a non-free-radically polymerizable organometallic compound comprising a group IV metal atom, e.g., Si, and an aliphatic carbon atom bonded directly to said metal atom and to a hydrogen atom, e.g., tetraalkylsilane, tetraalkylstannane, or tetraalkylgermane.

In another aspect, this invention provides a fluorine-containing polymer comprising a fluorine-containing, saturated, carbon-carbon backbone chain comprising interpolymerized units derived from fluorine-containing ethylenically unsaturated monomer, and an organometallic group, derived from a non-free-radically polymerizable organometallic compound, comprising a group IV metal atom and an aliphatic carbon atom bonded directly to said metal atom.

The polymerization method of this invention can be used in aqueous emulsion or suspension polymerization to rapidly prepare low molecular-weight fluorine-containing polymers that are easy to process. These results can be obtained with low levels of free-radical initiator and organometallic compound (conventional aqueous emulsion or suspension polymerization of fluorine-containing monomer typically uses large amounts of both free-radical initiator and chain-transfer agent in order to obtain low molecular-weight and rapid polymerization).

Suitable monomers for use in the method and polymer of this invention include the terminally unsaturated monoolefins typically used for the preparation of fluorine-containing polymers such as vinylidene fluoride, hexafluoropropene, chlorotrifluoroethylene, 2-chloropentafluoropropene, perfluoroalkyl vinyl ethers, e.g., $CF_3OCF=CF_2$ or $CF_3CF_2OCF=CF_2$, tetrafluoroethylene, 1-hydropentafluoropropene, 2-hydropentafluoropropene, dichlorodifluoroethylene, trifluoroethylene, 1,1-dichlorofluoroethylene, vinyl fluoride, and mixtures thereof. Perfluoro-1,3-dioxoles such as

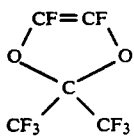

may also be used. The perfluoro-1,3-dioxole monomers and their copolymers are described, for example, in U.S. Pat. No. 4,558,141 (Squire). Certain fluorine-containing di-olefins are also useful, such as, perfluorodiallylether and perfluoro-1,3-butadiene. Said fluorine-containing monomer, or fluoromonomer, may also be copolymerized with fluorine-free terminally unsaturated monoolefin comonomers, e.g., ethylene or propylene. Preferably at least 5% by weight of all monomers in said polymerizable mixture are fluorine-containing. Said fluorine-containing monomer may also be copolymerized with iodine- or bromine-containing cure-site comonomers in order to prepare peroxide curable polymers, e.g., fluoroelastomers. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1. Preferably, all or essentially all of the comonomers in said polymerizable mixture are ethylenically unsaturated monomers.

Preferred group IV metals in the organometallic compounds useful in this invention are silicon, germanium, and tin. Preferred organometallic compounds are relatively low molecular weight compounds comprising from 1 to 10 group IV metal atoms, or oligomeric liquids, oils, or greases, e.g. silicone oils, comprising from 10 to 200 group IV metal atoms. Said metal atoms are bonded directly to each other, or linked to each other through carbon atoms or hetero atoms, e.g., O, N, S, P and the like, e.g., $(CH_3)_3Si-NH-Si(CH_3)_3$. Silanes, silazanes, and siloxanes are particularly preferred.

A class of organometallic compounds useful in this invention can be represented by the formula

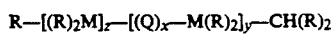      I $R-[(R)_2M]_z-[(Q)_x-M(R)_2]_y-CH(R)_2$ where M is Si, Sn, or Ge, Q is a divalent linking group, e.g. —S—, —O—, alkylene, e.g., —CH$_2$—, —NR—, arylene, e.g., C$_6$H$_4$ (i.e., phenylene), or combinations thereof, each R is independently H, alkyl, aryl, or combinations thereof such as alkaryl or aralkyl, x is 0 or 1, z is 0 or 1, y is an integer from 1 to 9. As used herein, alkyl and alkylene includes substituted and cyclic moieties, e.g., fluoroalkyl, and cycloalkyl.

Representative examples of such compounds are

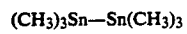

$(CH_3)_3Sn-Sn(CH_3)_3$

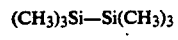

$(CH_3)_3Si-Si(CH_3)_3$

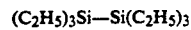

$(C_2H_5)_3Si-Si(C_2H_5)_3$

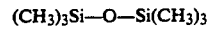

$(CH_3)_3Si-O-Si(CH_3)_3$

$(CH_3)_3Si-NH-Si(CH_3)_3$

$Si(C_2H_5)_4$

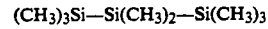

$(CH_3)_3Si-Si(CH_3)_2-Si(CH_3)_3$

$H-Si(C_2H_5)_3$

$H_2Si(CH_3)_2$

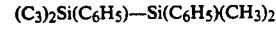

$(C_3)_2Si(C_6H_5)-Si(C_6H_5)(CH_3)_2$

$Si(CH_3)_4$

$(CH_3)_3Si-S-(C_6H_5)$

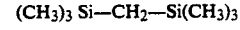

$(CH_3)_3Si-CH_2-Si(CH_3)_3$

$(CH_3)_3Si-(C_6H_4)-Si(CH_3)_3$

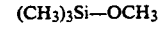

$(CH_3)_3Si-OCH_3$

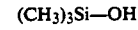

$(CH_3)_3Si-OH$

$Ge(CH_3)_4$

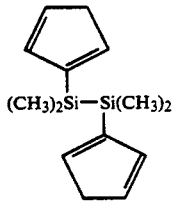

A second class of organometallic compounds useful in this invention is the class of cyclic compounds where the metal atoms are part of a ring. Representative examples of such compounds are cyclic silanes and siloxanes such as:

hexamethylcyclotrisiloxane,

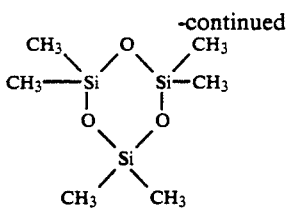

dodecamethylcyclohexasilane,

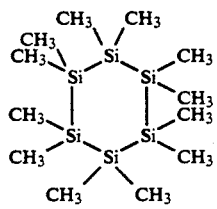

and octamethylcyclotetrasiloxane,

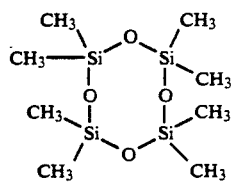

The method of this invention can comprise the use of certain group IV organometallic compounds in otherwise conventional free-radical polymerization of ethylenically unsaturated monomers. Such conventional polymerization includes free-radical polymerization of the monomers alone or as solutions, emulsions, or dispersions in an organic solvent or water. Polymerization in an aqueous emulsion or suspension is often preferred because of the rapid and nearly complete conversion of monomers, easy removal of the heat of polymerization and ready isolation of the polymer. Emulsion or suspension polymerization of fluorine-containing monomer typically involves polymerizing monomers in an aqueous medium in the presence of an inorganic free-radical initiator system, and surfactant or suspending agent.

The formation of group IV organometallic alkyl radicals is described in P. Krusic, and J. Kochi, "Electron Spin Resonance of Group IV Organometallic Alkyl Radicals in Solution," *J. Am. Chem. Soc.*, Vol.91, pp. 6161-6164, (1969). Alkyl derivatives of silicon, germanium, and tin were used to generate carbon-centered radicals by removal of a hydrogen atom from a carbon atom bonded directly to the metal.

The organometallic compounds useful in the method of this invention are non-free-radically polymerizable compounds that do not react with water or monomer, but do react with radicals, e.g., the radical end of a growing polymer-chain. The organometallic compound thus acts as a chain-transfer agent by terminating the polymerization of one polymer-chain and initiating the polymerization of a new polymer-chain.

Conventional inorganic free-radical initiators can be used in the free-radical polymerization method of this invention. Emulsion and suspension polymerization is preferred. Water-soluble inorganic peroxides known to the prior art, such as sodium, potassium, or ammonium persulfates, perphosphates, perborates, percarbonates, or permanganates are useful. The free-radical initiators can be further activated by reducing agents such as sodium, potassium, or ammonium sulfite, bisulfite, metabisulfite, hyposulfite, thiosulfite, phosphite, sodium or potassium formaldehyde sulfoxylate or hypophosphite, or by easily oxidized metal compounds such as ferrous, cuprous, and silver salts.

Aqueous emulsion and suspension polymerizations may be carried out under conventional steady-state conditions in which, for example, the monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

The amount of organometallic compound used can vary, depending for example on the molecular weight of polymer desired. Preferably from 0.4 to 400 mmoles, and most preferably from 0.4 to 100 mmoles, of organometallic compound are used per Kg of monomer.

The polymer of this invention comprises a fluorine-containing, saturated, carbon-carbon backbone chain whose interpolymerized units are derived from ethylenically unsaturated monomers. For example, where vinylidene fluoride and hexafluoropropene are copolymerized the interpolymerized units are —CH$_2$—CF$_2$— and —CF(CF$_3$)—CF$_2$—. Said polymer also comprises at least one organometallic group, derived from a non-free-radically polymerizable organometallic compound, comprising a group IV metal atom and an aliphatic carbon atom bonded directly to said metal. Particularly preferred organometallic groups are silyl, silazyl, or siloxyl. Preferably, said organometallic group terminates a polymer chain or branch as an end-group.

A class of the polymers of this invention comprise an organometallic group (covalently bonded to the polymer) which can be represented by the formula

where M, Q, R, x, z, and y are as described above for formula I.

The polymers of this invention, such as fluoroelastomer gums, may be compounded and cured using conventional methods. Such polymers are often cured by nucleophiles such as diamines, polyhydroxy compounds, or fluoroaliphatic sulfonamides. Certain polymers may be cured with peroxides. For example, the fluoroelastomers of this invention may be crosslinked with aromatic polyhydroxy compounds, such as bisphenols, which are compounded with the polymer along with a curing accelerator, such as a quaternary phosphonium salt, and acid acceptors, such as magnesium oxide and calcium hydroxide. Particularly useful polyhydroxy compounds include 4,4'-thiodiphenol, isopropylidene-bis(4-hydroxybenzene), and hexafluoroisopropylidene-bis(4-hydroxybenzene) ("bisphenol AF") which are described, for example, in U.S. Pat. No. 4,233,421 (Worm). Such crosslinking methods are described, for example, in U.S. Pat. No. 4,287,320 (Kolb), 4,882,390 (Grootaert et al.), and U.S. Pat. No. 5,086,123 (Guenthner et al.). A cure-site monomer susceptile to free-radical attack is required to render polymers peroxide curable. For example, polymers which contain interpolymerized units derived from iodine- or bromine-containing monomers are often peroxide-curable. Such cure-site monomers are described, for example, in U.S. Pat. No. 4,035,565 (Apotheker et al.) and U.S. Pat. No. 4,450,263 (West).

The polymers of this invention can also be compounded with processing agents, such as those conventionally used to aid in the molding or extrusion of the formulation, e.g. carnauba wax or dichlorodiphenyl sulfone. Fluoroaliphatic sulfonamides can also be used as processing aids, including those of the formula $R_fSO_2NHR''$, where $R_f$ is a fluoroaliphatic radical such as a perfluoroalkyl, e.g., $C_nF_{2n+1}$ where n is 4 to 20, or perfluorocycloalkyl, e.g., $C_nF_{2n-1}$ where n is 5 to 20, such compounds being described, for example, in Australian Pat. No. 58,641 (Guenthner et al.). Another type of processing aid which can be used in this invention is diorgano sulfur oxides, such as those described in U.S. Pat. No. 4,287,320 (Kolb).

Fillers can be mixed with the polymers of this invention to improve molding characteristics and other properties. When a filler is employed, it can be added to the vulcanization recipe in amounts of up to about 100 parts per hundred parts by weight of gum, preferably between about 15 to 50 parts per hundred parts by weight of the gum. Examples of fillers which may be used are thermal-grade carbon blacks or fillers of relatively low reinforcement characteristics such as clays and barytes.

The organometallic compounds useful in this invention result in polymers which can have a variety of non-polar, non-ionic end-groups comprising a group IV metal atom. These non-ionic end-groups generally result in improved properties such as improved thermal stability and improved rheological behavior. Polymers with non-ionic end-groups exhibit lower apparent viscosities during processing, e.g. injection molding, when compared at the same shear rates to polymers with ionic end-groups. The resulting polymers may be elastomers or plastics. The polymers may be shaped to form useful articles including O-rings, fuel-line hoses, shaft seals, and wire insulation.

The polymers of this invention can be mixed with other polymers, for example, with polymers of higher or lower molecular weight to give a bimodal molecular-weight mixture. For example, low molecular-weight polymers of this invention can be mixed with conventional fluorine-containing polymers to improve the processing characteristics thereof.

EXAMPLES

In the following Examples and Comparative Examples polymers were prepared. Viscosity of the resulting polymer was determined using the following test methods.

Mooney Viscosity

Mooney viscosities were measured at 121° C. using a Monsanto Mooney Viscometer model MV 2000, a large rotor, 1 minute preheat, and measurement after 10 minutes ("ML 1+10 @121° C."), according to ASTM D1646-81.

Inherent Viscosity

Inherent viscosity ("iv") was measured using dilute solutions of the polymers in 2-butanone at 35° C. Three samples were run for each polymer (1.0, 0.5, and 0.25 wt. % solids). An Ostwald viscometer was used and the iv was calculated using the following formula: $iv=[\ln(t/t_s)]/c$, where t is the time for the solution to flow between the markers, ts is the time to flow between the markers for solvent without polymer, and c is the concentration of the solution in g/dL.

In the following Examples 1-8 and Comparative Examples C1-C4, fluoroelastomer polymers were prepared by free-radical initiated emulsion-polymerization. The monomers utilized were vinylidene fluoride ("VF$_2$"), hexafluoropropene ("HFP"), and tetrafluoroethylene ("TFE"). The polymers produced were either copolymers of VF$_2$ and HFP, or terpolymers of VF$_2$, HFP, and TFE.

The Examples of this invention utilized silanes and siloxanes as the organometallic compound. The polymers of the Examples of this invention were analyzed by proton NMR and shown to contain at least one silane or siloxane group.

In the Comparative Examples, diethylmalonate was used as a chain-transfer agent, or no chain-transfer agent was used, instead of a silane or siloxane.

EXAMPLE 1

A solution of 9 g of K$_2$HPO$_4$ and 3 g of K$_2$S$_2$O$_8$ in 2800 g of water was placed in a 4-liter pressure reactor. The reactor was evacuated and filled with nitrogen four consecutive times and 1.8 g of hexamethyldisilane ("HMDS") was added via syringe through a septum on a inlet valve. The contents of the reactor were stirred with a mechanical stirrer, heated to 71° C., and the reactor was pressurized to 1.24 to 1.31 MPa with a monomer mixture of 61.7 wt. % VF$_2$ and 38.3 wt. % of HFP. Pressure was maintained between 1.24 and 1.31 Mpa during polymerization by adding more of the monomer mixture. After 750 g of monomer mixture had been added, the reaction mixture was cooled to room temperature, and excess unreacted monomer mixture was vented. The reaction time ("R-Time") was 6.5 hrs. The resulting latex was coagulated by dripping it into an agitated solution of 20 grams of magnesium chloride hexahydrate in 800 mL of deionized water. The resulting copolymer of HFP and VF$_2$ was then washed four times with 2.5 L of hot (75° to 80° C.) deionized water, and the washed polymer gum dried overnight in a circulating air oven at 90° to 100° C.

EXAMPLES 2-4 AND COMPARATIVE EXAMPLES C1-C3

In Examples 2-4 and Comparative Examples C1-C3 copolymers of HFP and VF$_2$ were prepared as in Example 1 except with the amounts of ingredients as shown in Table 1. Example 4 and Comparative Example C3 also contained 0.6 g and 2.4 g, respectively, of FC-128 fluorochemical emulsifier available from 3M Company. The organometallic compound used in Examples 2-4 was either hexamethyldisilane (HMDS), tetramethylsilane ("TMS"), or hexamethyldisiloxane ("HMDSO"). The Comparative Examples C1-C3 do not contain organometallic compound. Comparative Examples C2 and C3 used diethylmalonate (DEM) as chain-transfer agent. Each Example and Comparative Example utilized 2800 g of deionized water and a monomer mixture of 61.7 wt. % VF$_2$ and 38.3 wt. % HFP.

TABLE 1

|  | Examples | | | Comparative Examples | | |
| --- | --- | --- | --- | --- | --- | --- |
|  | 2 | 3 | 4 | C1 | C2 | C3 |
| $K_2HPO_4$ (g) | 9 | 9 | 9 | 9 | 9 | 6.3 |
| $K_2S_2O_8$ (g) | 5 | 3 | 5 | 3 | 3 | 15.3 |
| chain transfer agent, g | HMDS, 3 | HMDSO, 2 | TMS 1.8 | none, 0 | DEM, 2 | DEM, 11.4 |
| monomer (g) | 780 | 800 | 680 | 780 | 800 | 1000 |
| R-Time (hrs) | 6.5 | 6 | 4 | 2.5 | 4.5 | 6.5 |

The polymers of the above Examples and Comparative Examples were analyzed for the presence of silane or siloxane groups by proton NMR. The Mooney (ML 1+10 @121° C.) viscosity ("Mooney") was measured for each polymer. Where the Mooney viscosity was 0, the inherent viscosity was also measured. The results are summarized in Table 2.

TABLE 2

|  | Examples | | | | Comparative Examples | | |
| --- | --- | --- | --- | --- | --- | --- | --- |
|  | 1 | 2 | 3 | 4 | C1 | C2 | C3 |
| chain transfer agent, moles | HMDS .012 | HMDS .021 | HMDSO .012 | TMS 0.20 | None 0 | DEM .012 | DEM .071 |
| Mooney | 24 | 0 | 57 | 39 | 194 | 105 | 0 |
| iv | — | 0.15 | — | — | — | — | 0.18 |

The proton NMR of the polymers of Examples 1–4 showed the presence of $CH_3$—Si in each polymer at 0.1 to 0.5 ppm in the spectra. The higher effectiveness of the silane and siloxane compounds as chain-transfer agents for reducing molecular weight is shown in Table 2 by lower Mooney-viscosity or a lower iv which indicates lower molecular weight For example, although Example 3 and Comparative Example C2 used equimolar amounts of chain-transfer agent and persulfate initiator, the polymer prepared in Example 3 had a much lower Mooney viscosity. Comparing Example 2 to Comparative Example C3 shows that lower iv was obtained in the same reaction time but with much less persulfate initiator and much less chain-transfer agent, when the method of this invention was used.

EXAMPLE 5

In Example 5 a terpolymer of HFP, $VF_2$, and TFE was prepared as in Example 1 except the polymerization was run in a 86-Liter reactor using 45 Kg deionized water, 145 g $K_2HPO_4$, 50 g HMDS, the pressure was held constant at 0.90 MPa instead of 1.24 to 1.31 Mpa, 18.25 Kg of a monomer mixture containing 23.6 wt. % TFE, 31.5 wt. % HFP, and 44.9 wt. % $VF_2$ was consumed, and 11.6 g FC-128 emulsifier was used. Instead of $K_2S_2O_8$, 60 g of $(NH_4)_2S_2O_8$ was used as free-radical initiator. The reaction time was 6 hrs, and the Mooney viscosity was 8.

EXAMPLES 6–7 AND COMPARATIVE EXAMPLES C3–C4

In Examples 6–7 and Comparative Examples C3–C4, terpolymers of HFP, $VF_2$, and TFE were prepared as in Example 5 except using the amounts of ingredients shown in Table 3. Each Example and Comparative Example used 45 Kg of deionized water and the same monomer mixture as in Example 5. The reaction time for each Example and Comparative Example was 6 hours.

TABLE 3

|  | Examples | | | Comparative Examples | |
| --- | --- | --- | --- | --- | --- |
|  | 5 | 6 | 7 | C3 | C4 |
| $K_2HPO_4$ (g) | 145 | 145 | 145 | 145 | 185 |
| $(NH_4)_2S_2O_8$ (g) | 60 | 40.4 | 40.4 | 60 | 0 |
| $K_2S_2O_8$ (g) | 0 | 0 | 0 | 0 | 250 |
| chain-transfer agent (g) | HMDS 50 | HMDS 50 | HMDS 9.3 | DEM 54.6 | DEM 185 |
| FC-128 (g) | 11.6 | 11.6 | 11.6 | 11.6 | 9.9 |
| Mooney | 8 | 40 | 145 | 63 | 2 |

The data in Table 3 show that high level of both persulfate and chain-transfer agent were needed to make a low-viscosity gum at a reasonable reaction rate using conventional systems. For example, comparing Example 5 with Comparative Example C3 shows that when using equal molar amounts of chain-transfer agent and initiator, the method of this invention resulted in a polymer with lower Mooney-viscosity. Comparative Example C4 illustrates the high levels of initiator and chain-transfer agent needed to prepare a low Mooney-viscosity polymer using conventional methods.

EXAMPLE 8

In Example 8 a terpolymer of HFP, $VF_2$, and TFE was prepared as in Example 1 except using an 86-L reactor and with 45 Kg deionized water, 160 g ammonium persulfate, 145 g $K_2HPO_4$, 11.6 g FC-128 emulsifier, 200 g HMDS, and 11.25 Kg of a monomer mixture containing 44.9 wt. % $VF_2$, 31.5 wt. % HFP, and 23.6 wt. % TFE. The pressure was maintained during the run at 0.90 MPa. The temperature was 71° C. Agitation was 140 rpm, and the reaction time was 6 hrs. The Mooney viscosity was 0. The inherent viscosity of the resulting terpolymer of HFP, $VF_2$, and TFE was 0.10.

EXAMPLE 9

In this Example, chlorotrifluoroethylene ("CTFE") was polymerized by suspension polymerization to form a fluoroplastic. The initiation system consisted of a redox initiator rather than a thermal initiator.

A 4-liter reactor was charged with deionized water (2600 g), $K_2HPO_4$ (4.0 g), $Na_2HPO_4$ (4.0 g), $K_2S_2O_8$ (15 g), $CuSO_4.5H_2O$ (0.08 g), hexamethyl disilane (2.0 g) and CTFE (195 g). The pressure in the reactor was 0.37 MPa at 12° C. The reactor contents were agitated (350 rpm) and a solution of $K_2SO_3$ (10 wt. % in deionized water) was fed into the reactor by the use of a metering pump. When a pressure drop occurred (indicative of polymerization) CTFE was fed into the reactor in order to maintain a constant pressure of 0.37 to 0.39 MPa. Over a period of 5 hours, a total of 945 g of CTFE monomer (including the 195 g precharged) was added and a total of 429 g of the 10% $K_2SO_3$ solution was pumped into the reactor. The reactor was drained and the CTFE polymer was isolated by filtration, washed with a mixture of a deionized water and methanol, and the washed polymer was dried in a circulating air oven at 110° C. The polymer was a white powder. A proton NMR spectrum of the polymer revealed the presence of Si—$CH_3$ at 0.05 ppm.

EXAMPLES 10-21

In Examples 10-21, terpolymers of $VF_2$, HFP, and TFE were prepared according to the procedure and using reactants described in Example 5, except using 25 g (instead of 50 g) of HMDS, 40 g (instead of 60 g) of $(NH_4)_2S_2O_8$, and 11.5 g of FC-128 emulsifier. The amounts of each monomer are shown in Table 4. The reaction time varied from 4 to 9.5 hours. The Mooney viscosity and weight percent fluorine (determined by F-NMR analysis) of each of the polymer products was determined. The results are shown in Table 4.

TABLE 4

| Ex. No. | Monomers (wt. %) | | | Mooney viscosity | Wt. % F |
|---|---|---|---|---|---|
| | $VF_2$ | HFP | TFE | | |
| 10 | 40 | 30 | 30 | 68 | 69.5 |
| 11 | 40 | 40 | 20 | 65 | 69.3 |
| 12 | 50 | 20 | 30 | 57 | 67.5 |
| 13 | 50 | 30 | 20 | 57 | 67.5 |
| 14 | 60 | 20 | 20 | 69 | 65.9 |
| 15 | 60 | 30 | 10 | 39 | 65.8 |
| 16 | 30 | 40 | 30 | 22 | 71.4 |
| 17 | 70 | 10 | 20 | 28 | 64.3 |
| 18 | 30 | 50 | 20 | 48 | 71.0 |
| 19 | 50 | 20 | 30 | 43 | 67.6 |
| 20 | 50 | 20 | 30 | 47 | 67.6 |
| 21 | 40 | 20 | 40 | 56 | 69.7 |

EXAMPLES 22-30

Nine of the fluorine-containing polymers prepared in Examples 10-21 were cured with a bisphenol crosslinking-agent and onium accelerator, and the physical properties of the resulting cured polymers were determined. 100 g of fluorine-containing polymer was mixed with the following curing and compounding ingredients: 0.862 g of tributyl (2-methoxy)propylphosphonium bisphenoxide AF, which was prepared as described in U.S. Pat. No. 4,882,390 (Grootaert et al.), as a 57.5 wt. % solution in methyl alcohol; 1.23 g of bisphenol AF, as a 70 wt. % solution in ethanol; 30 g of carbon black (Thermax MT TM, ASTM N990) as reinforcing agent; 3 g of magnesium oxide (Maglite D TM) as acid acceptor; and 6 g calcium hydroxide as acid acceptor.

The compounded polymers were press-cured for 10 min. at 177° C. and post-cured for 16 hours at 232° C. and physical properties determined. Tensile strength at break, elongation at break, and modulus at 100% elongation were obtained using ASTM Method D 412-80 on a sample cut from 1.8 mm sheet of cured polymer with ASTM Die D. Hardness (Shore A) was measured at room temperature on cured samples according to ASTM Method D-2240-81 using Shore Instrument and Mfg. Co. "A-2" hardness measuring device. Compression set was determined using ASTM Method D-395-78, Method B, on cured (10 min. press cure at 177° C. followed by 16 hours postcure at 232° C.) O-rings after 25% compression for 70 hours at 200° C. Compression set is reported as percent of original deformation remaining. The polymers that were compounded and cured, and the resulting physical properties of the cured polymers are summarized in Table 5.

TABLE 5

| Ex. No. | Fluoro-polymer of Ex.* | Tensile strength (MPa) | Elongation (%) | Modulus (MPa) | Hardness | Compression set (%) |
|---|---|---|---|---|---|---|
| 22 | 10 | 11.16 | 242 | 4.10 | 82 | 27.5 |
| 23 | 11 | 9.36 | 273 | 3.08 | 76 | 34.6 |
| 24 | 12 | 14.76 | 201 | 6.67 | 84 | 29.1 |
| 25 | 13 | 11.80 | 219 | 4.25 | 78 | 27.4 |
| 26 | 14 | 14.23 | 194 | 6.00 | 80 | 24.4 |
| 27 | 15 | 10.65 | 158 | 5.74 | 78 | 26.8 |
| 28 | 18 | 7.20 | 442 | 2.53 | 83 | 47.9 |
| 29 | 19 | 15.76 | 198 | 7.17 | 88 | 28.3 |
| 30 | 20 | 15.14 | 199 | 6.77 | 89 | 27.9 |

*compounded and cured as described above

The data in Table 5 show that the polymers of this invention may be compounded and cured to give shaped articles with typical fluoroelastomer physical-properties.

EXAMPLE 3

In this example, the HFP, $VF_2$, and TFE terpolymer of Example 6 was cured as described in Examples 22-30, except that a fluoroaliphatic sulfonamide curing-agent was also used in addition to a bisphenol and onium accelerator.

100 g of the HFP, $VF_2$, and TFE terpolymer of Example 6 was mixed with the following curing agents and compounding ingredients: 0.805 g of tributyl (2-methoxy)propylphosphonium bisphenoxide AF as a 57.5 wt. % solution in methyl alcohol; 1.54 g of bisphenol AF as a 70 wt. % solution in ethanol; 0.5 g N-methyl perfluorooctanesulfonamide, $C_8F_{17}SO_2NH(CH_3)$; 30 g of carbon black (Thermax MT TM, ASTM N990) as reinforcing agent; 3 g of magnesium oxide (Maglite D TM) as acid acceptor; and 6 g calcium hydroxide as acid acceptor.

The compounded fluoroelastomer composition was press-cured and post-cured, and properties determined as described for Examples 22-30. Physical properties are summarized in Table 6.

TABLE 6

| Ex. No. | Tensile strength (MPa) | Elongation (%) | Modulus (MPa) | Hardness |
|---|---|---|---|---|
| 31 | 13.59 | 187 | 6.12 | 77 |

The data in Table 6 show that typical fluoroelastomer physical-properties were obtained with a polymer of this invention when a fluoroaliphatic sulfonamide was used as a co-curing agent.

EXAMPLE 32

In Example 32, a copolymer of $VF_2$ and HFP was prepared as in Example 1, except with 4 g (0.023 moles) of octamethyl cyclotetrasiloxane instead of HMDS, and with 0.6 g FC-128 emulsifier. Reaction time was 5 hrs, with 710 g monomer consumed. The polymer was isolated, and analyzed as in Example 1. The Mooney viscosity was 62, and the H-NMR showed the presence of Si—$CH_3$ at 0.1 ppm.

Various modifications and alterations of this invention will be apparent to those skilled in the art without departing from the scope and spirit of this invention and this invention should not be restricted to that set forth herein for illustrative purposes.

What is claimed is:

1. A fluorine-containing polymer comprising a fluorine-containing, saturated, carbon-carbon backbone chain comprising interpolymerized units derived from a fluorine-containing ethylenically unsaturated monomer, and an organometallic group, derived from a non-free-radically polymerizable organometallic group, comprising a silicon atom and an aliphatic carbon atom bonded directly to said silicon atom.

2. The polymer of claim 1 wherein said backbone chain consists essentially of interpolymerized units derived from ethylenically unsaturated monomer.

3. The polymer of claim 1 wherein said fluorine-containing monomer is selected from the group consisting of vinylidene fluoride, hexafluoropropene, chlorotrifluoroethylene, 2-chloropentafluoropropene, perfluoroalkyl vinyl ethers, tetrafluoroethylene, 1,1-hydropentafluoropropene, 2-hydropentafluoropropene, vinyl fluoride, dichlorodifluoroethylene, perfluorodiallylether, trifluoroethylene, 1,1-dichlorofluoroethylene, and perfluoro-1,3-dioxoles of formula

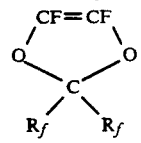

where each $R_f$ is F, $C_nF_{2n+1}$ where n is from 1 to 4, or where the two $R_f$ groups together form a ring of formula $C_nF_{2n-1}$ where n is from 5 to 8.

4. The polymer of claim 1 wherein said organometallic group comprises from 1 to 200 silicon atoms and wherein said silicon atoms are bonded directly to each other or through an alkylene group, arylene group, sulfur atom, oxygen atom, phosphorus atom, nitrogen atom, or combinations thereof.

5. The polymer of claim 4 wherein said organometallic group is silyl, silazyl, or siloxyl.

6. The polymer of claim 4 wherein said organometallic group has the formula

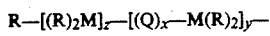

M is silicon, Q is a divalent linking group, each R is independently H, alkyl, aryl, or combinations thereof, x is 0 or 1, z is 0 or 1, y is an integer from 1 to 9.

7. The polymer of claim 5 wherein said carbon-carbon backbone chain consists essentially of interpolymerized derived from one or more monomers selected from the group consisting of tetrafluoroethylene, hexafluoropropene, vinylidene fluoride, chlorotrifluoroethylene, ethylene, propylene, perfluoromethyl vinyl ether, and perfluoropropyl vinyl ether.

8. The composition of claim 6 in its cured state.

9. A shaped article comprising the polymer of claim 1.

* * * * *

UNITED STATES PATENT AND TRADEMARK OFFICE
CERTIFICATE OF CORRECTION

PATENT NO. : 5,256,745
DATED : October 26, 1993
INVENTOR(S) : Werner M. Grootaert It is certified that error appears in the above-indentified patent and that said Letters Patent is hereby corrected as shown below:

Claim 1, col. 13, line 16 "group" should read --compound--.

Claim 3, col. 14, line 9 after "together" insert --with the carbon atom to which they are attached--.

Claim 3, col. 14, line 11 "$C_nF_{2n-1}$" should read --$C_nF_{2n-2}$--.

Claim 7, col. 14, line 29 after "merized" insert --units--.

Signed and Sealed this

Seventeenth Day of May, 1994

Attest:

BRUCE LEHMAN

*Attesting Officer*   *Commissioner of Patents and Trademarks*